(12) United States Patent
Ventrone

(10) Patent No.: US 6,405,234 B2
(45) Date of Patent: Jun. 11, 2002

(54) FULL TIME OPERATING SYSTEM

(75) Inventor: Sebastian Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/927,950

(22) Filed: Sep. 11, 1997

(51) Int. Cl.[7] .............................................. G06F 9/00
(52) U.S. Cl. ...................................... 709/102; 712/228
(58) Field of Search ............................ 709/100, 102, 709/107, 108; 712/228, 25, 26

(56) References Cited

U.S. PATENT DOCUMENTS

| | | | |
|---|---|---|---|
| 3,359,544 A | 12/1967 | Macon et al. | 340/172.5 |
| 3,766,532 A | 10/1973 | Liebel, Jr. | 340/172.5 |
| 4,030,079 A | 6/1977 | Bennett et al. | 340/172.5 |
| 5,361,359 A | 11/1994 | Tajalli et al. | 395/700 |
| 5,781,753 A * | 7/1998 | McFarland et al. | 712/218 |
| 5,857,096 A * | 1/1999 | Bistry et al. | 712/229 |
| 5,872,985 A * | 2/1999 | Kimura | 395/800.01 |
| 5,900,025 A * | 5/1999 | Sollars | 712/248 |
| 5,944,816 A * | 8/1999 | Dutton et al. | 712/215 |
| 6,055,559 A * | 4/2000 | Shimizu et al. | 709/107 |
| 6,148,325 A * | 11/2000 | Schmidt et al. | 709/107 |
| 6,205,467 B1 * | 3/2001 | Lambrecht et al. | 709/108 |

* cited by examiner

*Primary Examiner*—Zarni Maung
*Assistant Examiner*—George L. Opie
(74) *Attorney, Agent, or Firm*—Mark F. Chadurjian; Eugene I. Shkurko

(57) ABSTRACT

A processing system executing multiple programs and operating under control of an operating system, comprising a processor unit which includes a dispatch/decode unit under control of the operating system for dispatching and decoding instructions of the multiple programs, the instructions each including a program ID. The processor unit further comprises a plurality of execution units, each separately selectable by the operating system for receiving any of the instructions of the multiple programs from the dispatch/decode unit, wherein one of the execution units is executing an instruction from one of the multiple programs while another of the execution units is executing an instruction from another one of the multiple programs. The processor unit also comprises a retirement unit storing results of executed ones of the instructions uniquely in response to each program ID.

5 Claims, 4 Drawing Sheets

FULL TIME OPERATING SYSTEM

FIELD OF THE INVENTION

The invention pertains to operating systems for use in information handling systems such as computers.

BACKGROUND OF THE INVENTION

In the present state of the art, central processing units of computers ("processors") run programs in a so-called "time-slice" manner. That is, a single task will be running internally in the processor. The program will have 100% of its resources dedicated to the single task. A program pointer register keeps track of the current task within the processor. When the task needs other information, data, or another program, or times out, the processor stores out the state of the processor and restarts the operating system program. The operating system then determines which task or program segment to start next. The processor will store out the operating system program processor registers, read in the next program registers, and start the next task or program segment. The task or program segment that is running has no direct access to the resources of the system. Whenever the program tries to read or write a resource of the system, a "trap" occurs, and the operating system is restarted. The operating systems determines the cause of the trap and executes the request, then exits and restarts the program. This is a time-consuming and inefficient process.

FIG. 1 depicts a flowchart of the state of the prior art described above. As shown in FIG. 1, Program or Task A 10 tries to read or process or write a resource of the system. This causes the processor to store the state of the processor, exit Program or Task A in step 12, and restart the operating system program. In step 14, the operating system determines the problem, executes the request, then exits and restarts Program or Task A. In step 16, when Program or Task A is completed, the processor stores the state of the processor and, in step 18, restarts the operating system program. The operating system program then selects Program or Task B and starts it running in step 20.

SUMMARY OF THE INVENTION

To support full time operation and utilization of the operating system, modifications are needed to allow the operating system to remain running all the time. An object of this invention is to provide a full-time operating system that operates efficiently and is not being constantly restarted when information is needed.

To expedite operation and accommodate a full-time operating system, the operating system is not swapped out of the processor but rather is resident in the processor. The processor uses a dedicated operating system instruction set register. This register is a master instruction set register. Along with the operating control register, the operating system instruction set register uses a tagging macro to keep track of each operating system request. The tagging macro adds an operating system set bit to all requests. In this manner, all returning operating system instructions and data are tagged with the appropriate operating system operation.

The operating system tagging macro always operates at the level zero or at complete processor resources availability. All instruction types are available in the master instruction set register without exceptions. The operating system has the ability to reset any function register within the processor by direct means. The operating system also has access to the processor resources of any program register that the operating system is executing and any program register that a task is executing. In addition, the operating system has access to the control registers for itself and the control registers of the operating tasks.

In this way, the inefficiencies of the present state of the art of operating systems is avoided. The operating system of the present invention operates all of the time and is not constantly restarted upon demand.

DETAILED DESCRIPTION OF THE INVENTION

Figure 1:
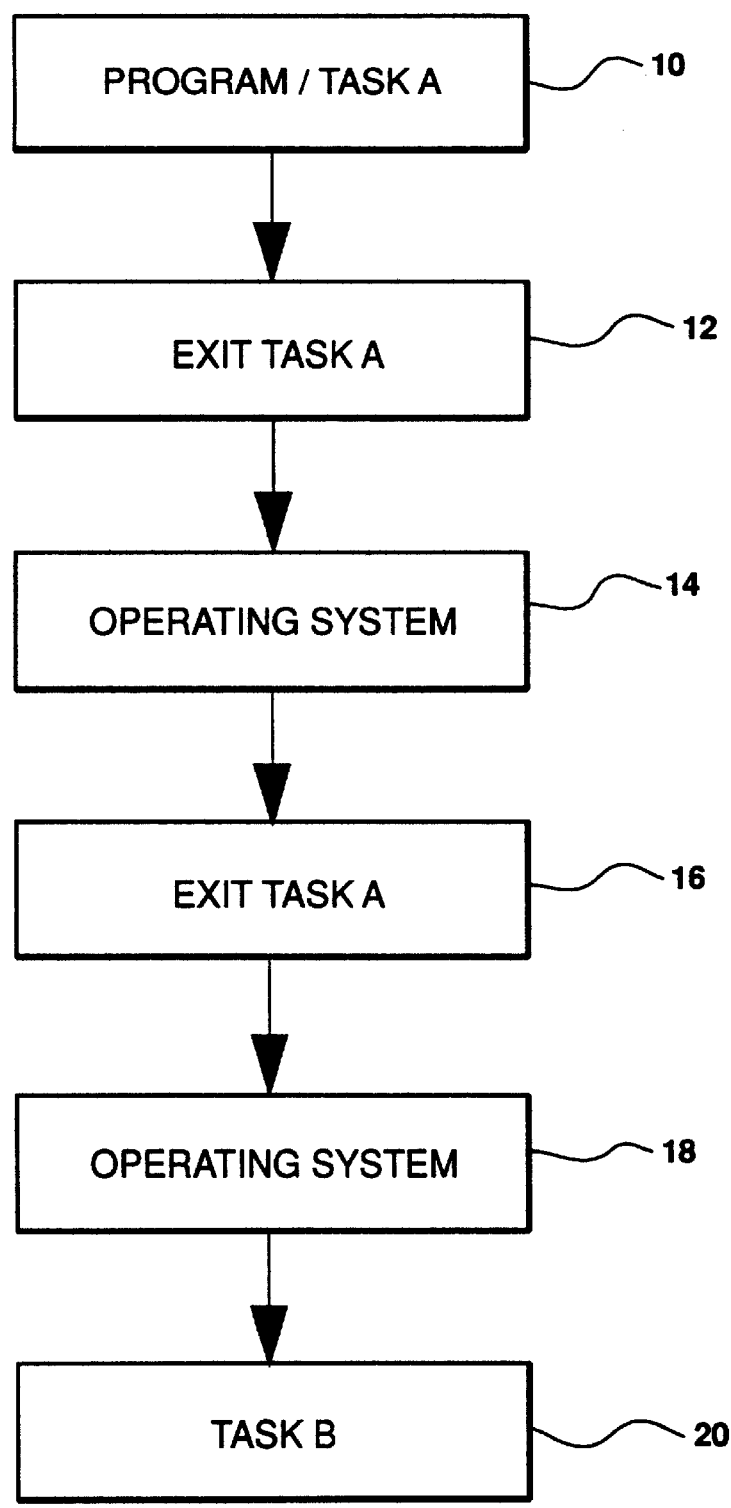
FIG. 1 depicts a flowchart of the prior art of inefficient use of the operating system.

The processor starts at reset, and the operating system is enabled. Only the operating system instruction register is active and clocked at this point. The first program fetches are operating system fetches. The operating system configures the system and processor. Once the initialization is complete, the operating system control macro enables the first task instruction registers and allows the first program fetch to occur. The operating system marks the program active and sets a task timer 1 on. The operating system control macro now starts the next task concurrent to the first task if a task is pending. Each operating task has its own set of instruction control registers and tags to separate the resources from each operating task. In this manner, each task is kept separate from each other task. In addition to the tags, each task requires its own program status register ("PSR") for program control. A PSR contains, for example, current program executing task control bits, status, overflows, and exceptions. Each task has its own PSR. For every execution unit, the tag is maintained and the results tagged. The task program status register is updated with the results. The operating system has direct access to each task instruction register and PSR. This access is a non-blocking access. The operating system is able to read the PSR in parallel to the operating tasks reading and updating the register.

In addition, the operating system control macro has access to the program visible general purpose registers. The ability of the operating system to have access to these registers provides some unique additional capabilities to programs currently not available. By providing new read task ID processor resources instructions, operating tasks can interact with each other by making operating system calls. Since the operating system is on board and resident in the processor, the operating system can service the call immediately and pass the requested contents to the calling task. This allows Task A to read in real time the Task B PSR, for example, and then perform an operation.

Another enhancement is that the operating system has the ability to update task registers and PSRs. The operating control macro issues a tag ID along with a resource ID to the main resource control macro. This is a non-transparent operation, since the operating system is actually changing the contents of a task's program model. By allowing this type of operation, one task could trigger another task to change program flow or start executing a segment code dependent upon the first task. The system thus has the ability to accommodate real time task interaction with direct processor resources communication.

The operating system control macro uses onboard timers to determine when to switch to a new task. These timers exist within the processor or externally depending upon the other implementation requirements. When a task is timed out, the processor automatically halts the task and saves the program visible resource. A key advantage of a real time operating system is that the operating system macro can monitor the real time task timers and start preparing for the next task reload before the current executing task times out. The processor can have a task pending set of registers that includes the instruction control register. The operating control register starts the loading of the next task into the processor.

The operating system macro maintains this data by one or more of several possible means. One means is a set of dedicated registers used in the same manner as the current operating task program or PSR. When a task times out, these registers are marked as active, and once the timed out task has halted, saves its contents. These become the next available set of task registers.

A second means utilizes a task stack register. The stack is not immediately executable. Once the timed out set of registers has been stored, then the stack is popped into these registers, and the task is started. By preloading the next task registers using the real time operating system, the next task to be executed can be executed as soon as the previous task has ended. Due to the register renaming capability of processors, the next executing task would not even have to wait for the exiting task to fully save its general purpose registers before starting. This results in significant increases in performance time and processing capability.

When a task is writing to a resource not directly available to the program level, the request will be handled real time. No longer will an exception cause the task to exit, the operating system to enter, determine the task request, execute the task request, exit, return the program and allow continued execution of the program, as the present state of the art requires. Instead, the task requesting the system resource triggers the operating system macro to respond to the request in real time. If other non-conflicting instructions are executing in parallel, then they will be allowed to execute. This ability is a critical improvement over current designs. Today, super scalar engines can require a large number of parallel executions for a current task. When one of these requests occurs that requires the external operating system, a complete flush of the pipeline is necessary, losing a very large number of cycles due to the one request. With the operating systems of this invention, the real time operating system services the request in parallel to any other non-dependent operations of that task. The instruction causing the request is locked until the request is satisfied. Any instruction dependent upon the results of that instruction also is locked by default. Once the operating system has returned the request, the locked instructions are unlocked, and the exception will be complete. An advantage of this invention is that the exception is handled entirely internally within the processor. The system data will be available real time to the requesting data, cutting down the system resource latency to an order of scale not obtainable with current implementations.

Another advantage to this approach is the reduction of external bus traffic. With the previous method, these requests would tie up many bus cycles as the executing task halted, saved, etc. Now the system request is satisfied by the real time operating system. The request is reduced to a simple fetch for only the data requested. The program model approaches the ideal case of the task having real time virtual resources.

Interrupts are handled directly by the real time operating system. No longer do the interrupts cause all program flow to stop execution. Instead the real time operating system stops execution of a single task to free up internal resources for the pending interrupt. One possible implementation is to keep a dedicated interrupt program control set register to allow the continued execution of the ongoing task. Since many interrupts are only to service some pending I/O request and would not even interfere with the internal operation of the processor, the ongoing task would continue to operate without the costly loss of time due to the present state of the art. Only if the pending interrupt requires internal resources is a task swapped out.

Also, system error interrupts requiring exit of current tasks would cause the running tasks to exit execution and an external save. Interrupt latency is improved greatly with the full-time operating system of the present invention. No longer will the interrupt have to wait for the current tasks to exit before the interrupt acknowledge cycle is allowed. The full-time operating system determines the course of action and when best to shut down tasks depending upon interrupt type. With sufficient resources, the operating system can even allow interrupt handling without the stopping of the current tasks. Like tasks, the interrupt can have an ID to allow the operating system and the master program control macro to keep the resources independent. Due to the nature of interrupts and the real time requirements, the master control macro has priority to the instructions associated with the interrupt routine. Also the onboard bus control moves ahead any executing tasks. The full-time operating system ensures that the interrupts execute in a similar manner to the current hardware even though allowing the running tasks to continue to execute.

Similar to the priority of the interrupts, the operating system monitors the resource requirements of the running tasks. The master program macro maintains a queue of pending instructions of multiple tasks. The operating system monitors the resource balancing to ensure that each task gets access to needed resources. If a task is locking out a critical junction in which another task requires use, the operating system passes the alternative task access command to the master program macro. In this case, the master control unit gives equal weighting to the pending task's instructions and alternates the granting of resources to each pending task instruction.

In addition, the operating system has the ability to grant non-symmetrical access to critical junction points. In this case, the operating system may have programmed a weighting factor for each executing task. In this case, the full-time operating system notifies the master program control macro to weight the granting of resources in favor of one task over another. The operating system will then determine when to grant the stalled task access to the blocked resource. In this manner, the operating system can grant the blocked task instruction any desired ratio of access. Once the resource is fully unblocked, the master control register grants the next request access to the resource. With this mechanism, the operating system gains the ability to balance the resource needs of the processor.

In a similar manner, the internal cache macros and external bus control unit send back to the full-time operating system the request queue information. The information includes the number and order of pending requests along with the task IDs. The operating system allows the default condition of equal access or can choose to override the default to allow one task a higher access value than another.

A critical need for this function occurs when a task performing extensive arithmetic function requests limited data access while, at the same time, some other task has a large number of back-to-back memory operations. If no weighting factor occurs, the single request could be delayed significantly by the other task. The real time operating system notifies the memory control unit to insert the arithmetic extensive task over the pending requests. One means of achieving this override is to utilize a priority tag, perhaps added on to the task ID by the full-time operating system. With this means, the critical performance of the arithmetic task can be maintained, while the overall performance of the memory transfer task is not significantly altered. The ability of the real time operating system to monitor internal resources and balance the execution by real time is a function available only to the real time operating system described in this invention.

Having generally described the full-time operating system of the present invention, reference is made to the drawings, each described below, for more specific examples of the operation of the full-time operating system of the present invention.

Figure 2:
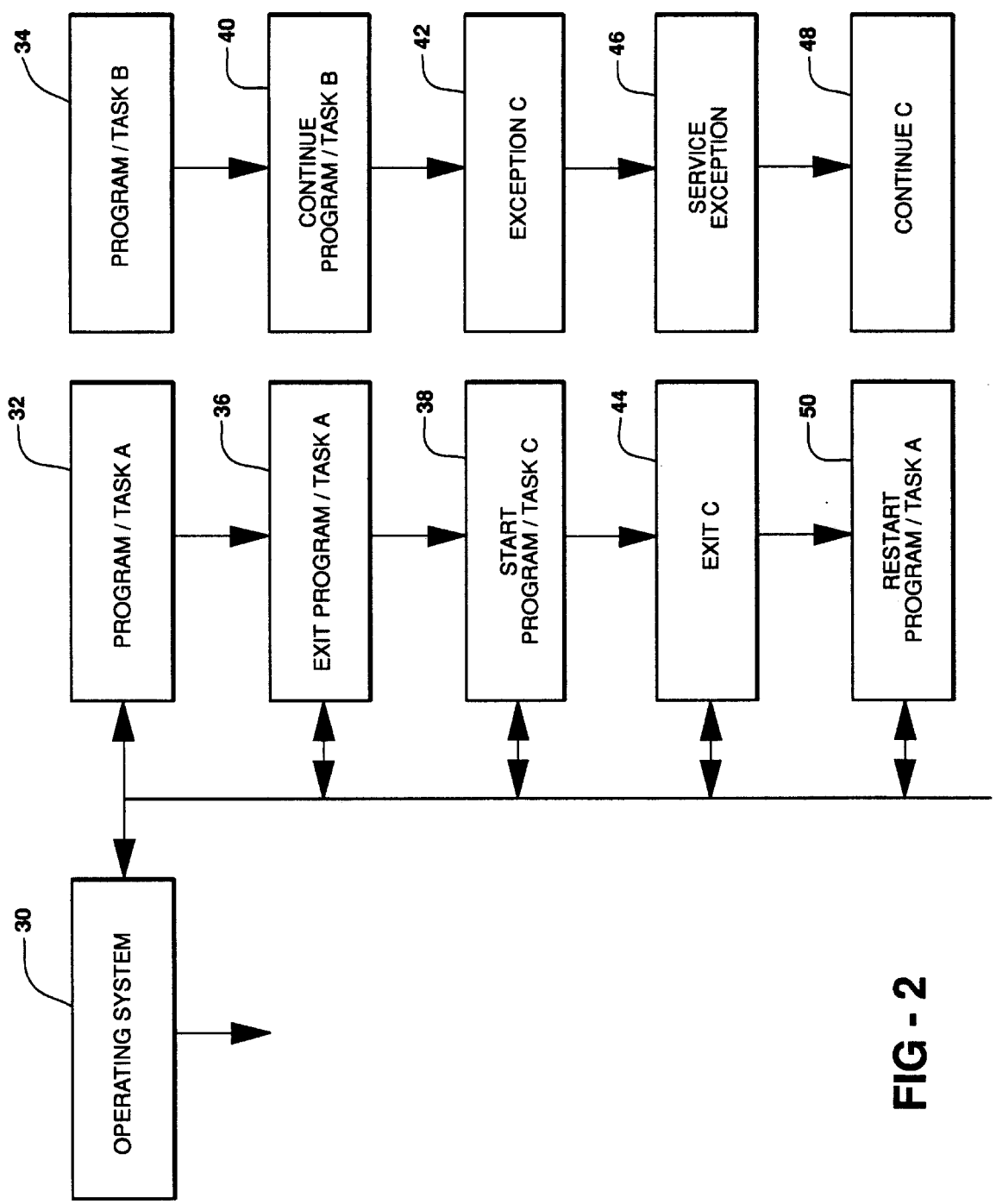
FIG. 2 depicts a flowchart of the full-time operating system of the present invention.

FIG. 2 depicts a flowchart of the present invention of a full-time operating system. As shown in FIG. 2, the full-time operating system 30 initially monitors Program or Task A 32 and Program or Task B 34. The operating system then exits Program or Task A in step 36 and starts Program or Task C 38 and continues in step 40 to run Program or Task B 34 while exiting Program or Task A. An exception, such as a higher priority task, becomes necessary. In step 42, Program or Task C is interrupted and then exited in step 44. Note that the interrupt exception does not have to wait for Program or Task C to exit before the interrupt exception is acknowledged. The exception is handled in step 46, at which point Program or Task C 38 continues in step 48. Meanwhile, Program or Task A 34 is restarted in step 50. The operating system 30 of the present invention runs continuously throughout the sequence of events. There is no need to start and stop the operating system as in the prior art shown in FIG. 1.

Figure 3:
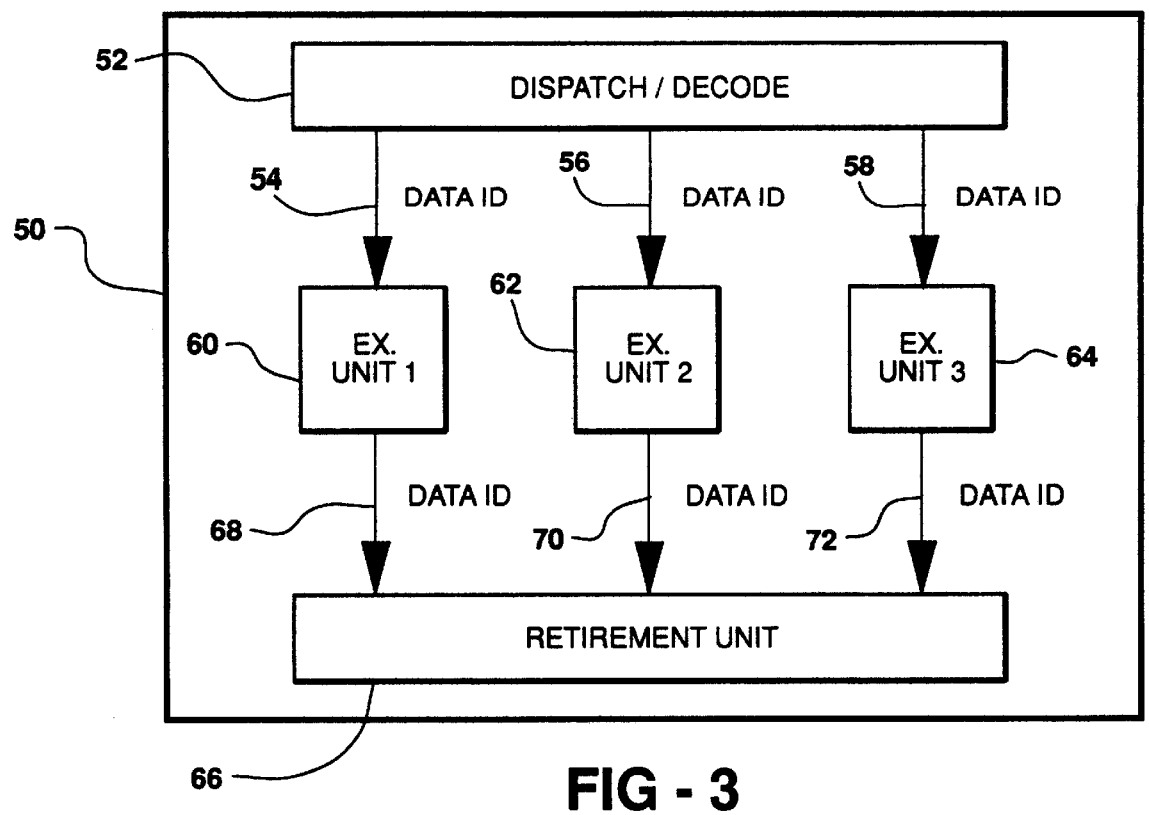
FIG. 3 depicts a processor unit in accordance with the present invention.

FIG. 3 shows a processor unit 50 in accordance with the present invention. The processor unit has a dispatch/decode unit 52 that is under the control of an operating system (not shown). The dispatch/decode unit 52 dispatches and decodes instructions of multiple programs that are executed by the processor unit 50. Each of the instructions has a program ID or data ID, such as, for example, 54, 56, and 58. The processor unit 50 also contains multiple execution units such as 60, 62, and 64, that are separately selectable by the operating system for receiving and executing instructions. One of the execution units 60, 62, or 64 can be executing an instruction from one program while another of the execution units is executing an instruction from another program. In the example of FIG. 3, execution unit 60 is operating on the instruction labeled as data ID 54 while execution unit 62 operates on the instruction labeled as data ID 56 and while execution unit 64 operates on the instruction labeled as data ID 58. Retirement unit 66 stores the output 68, 70, and 72, respectively, of each execution unit 60, 62, and 64, respectively.

Figure 4:
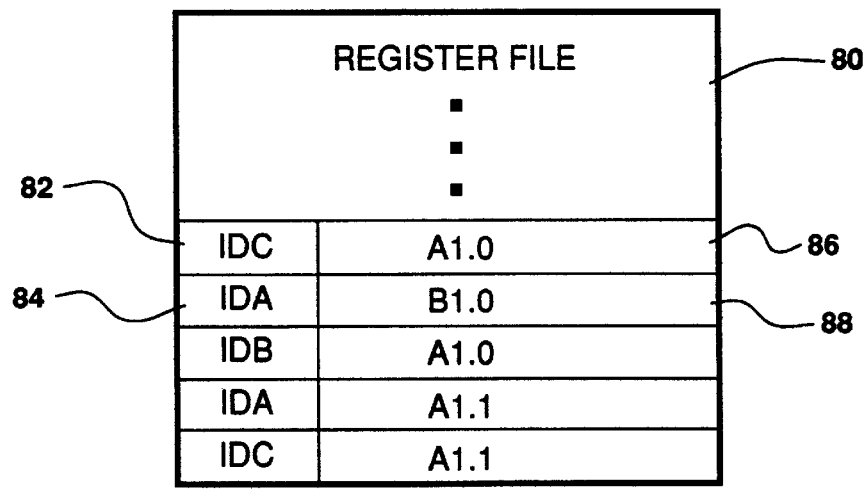
FIG. 4 depicts a register file in accordance with the present invention.

FIG. 4 depicts a register file 80 in accordance with the present invention. The register file typically is housed within the retirement unit 66, shown in FIG. 3. The register file 80 tracks data IDs such as those labeled 82 and 84 and on what execution units (such as 86 or 88) those programs are running. The register file 80 thus typically tracks all of the program or task visible registers and the data IDs (also called program IDs or task IDs). In FIG. 4, IDC, for example, refers to a data ID C. Note that data ID C is shown twice, in two different versions labeled A1.0 and A1.1. As is clear from FIG. 4, the present invention architecture supports super scalar operations and adds data ID references.

Figure 5A:
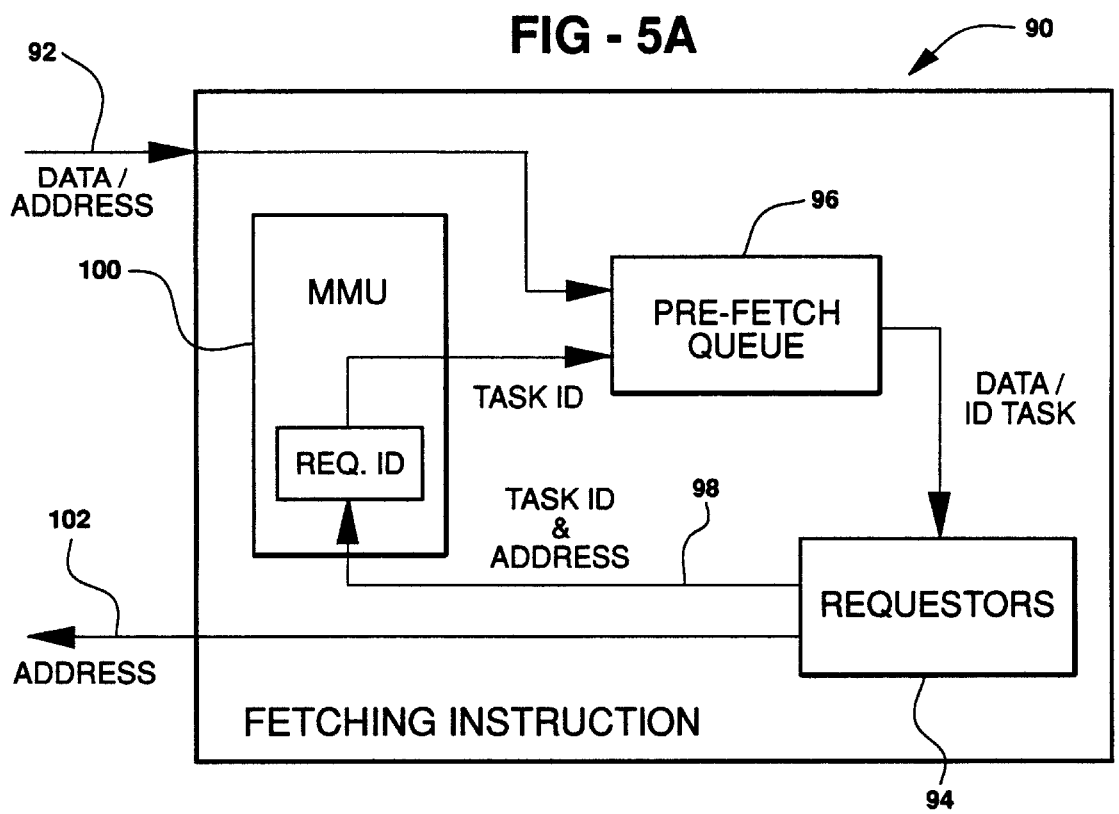
FIG. 5A depicts a block diagram of the handling of a request for data utilizing the operating system of the present invention.

FIG. 5A shows the handling of a request for data by the operating system of the present invention. Required data and address information 92 enters the processing unit 90 and is acknowledged by memory management unit (MMU) 100 and continues on to a pre-fetch queue 96 and then, together with a task ID, to requestor units 94. From the requestor unit 94, the data 92 may go together with a task ID and address 98 to the memory management unit (MMU) 100. The data 92 plus task ID 98 then go from the MMU unit 100 to the pre-fetch queue 96 where it waits until actually needed, at which point it moves to the requestor unit 94. The data 92 ultimately goes from the requestor unit 94 out of the processing unit 90 to an address 102.

Figure 5B:
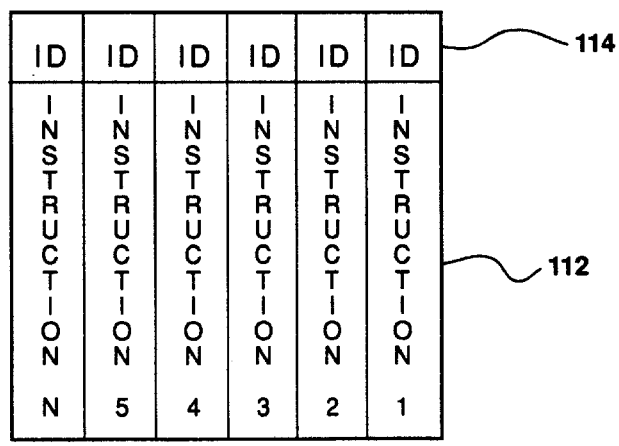
FIG. 5B shows a sample instruction queue.

FIG. 5B shows a sample instruction queue 110. The instruction queue 110 is composed of multiple individual instructions 112, each instruction having a separate ID 114.

The full-time operating system of the present invention allows the operating system to manage the resources of the processor to its optimum efficiency. No longer does the processor waste countless cycles switching from the current task back to the operating system. In addition, the operating system has full control of which tasks are running, ending, restarting, or causing an exception. Not only can the operating system detect an exception real time, but the exception can be handled without the saving and restoring of the task, saving hundreds of clock cycles and improving the real time execution of time critical code. In addition, load balancing is real time, since the operating system is always available to switch at a timed out task. In addition, information of the task can be transmitted to the end user, and the user has the option of load leveling as the tasks are executing.

The foregoing description of a preferred embodiment of the invention is not intended to limit the scope of the invention. The invention is limited only by the scope of the following claims and other equivalents.

What is claimed is:

1. A processing system executing multiple programs concurrently while under control of a full time resident operating system, the processing system comprising:

a processor unit including:
a dispatch/decode unit dispatching and decoding a first plurality of instructions of a first program of the concurrent multiple programs and at least a second plurality of instructions of at least a second program of the concurrent multiple programs while the operating system remains resident in the processor unit, the instructions each including a data ID;
a plurality of execution units, each separately selectable and controllable in real time by the operating system for receiving any of the plurality of instructions of the concurrent multiple programs from the dispatch/decode unit while the operating system remains resident in the processor unit, wherein a first plurality of the plurality of execution units executes concurrently the first plurality of instructions of the first program of the concurrent multiple programs while at least a second plurality of the plurality of execution units executes concurrently the at least a second plurality of instructions of the at least a second program of the concurrent multiple programs while the operating system remains resident in the processor unit; and a retirement unit storing results of executed ones of the instructions uniquely in response to each data ID.

2. The processing system of claim 1 wherein the processor unit further comprises at least one dedicated operating system instruction set register.

3. The processor system of claim 2 wherein the operating system instruction set register uses a tagging means to track the status of each instruction.

4. The processing system of claim 1 wherein the operating system further comprises means for resetting any register within the processor unit.

5. The processing system of claim 1 wherein the operating system further comprises means for granting non-symmetrical access to the processor unit and other processing system resources.

* * * * *